United States Patent [19]

Vaux

[11] Patent Number: 4,991,834
[45] Date of Patent: Feb. 12, 1991

[54] SHOCK-ATTENUATING SEAMLESS SURFACE SYSTEM FOR USE UNDER AND AROUND PLAYGROUND EQUIPMENT

[76] Inventor: Thomas M. Vaux, 437 Tenth Ave. West, Kirkland, Wash. 98033

[21] Appl. No.: 377,430

[22] Filed: Jul. 10, 1989

Related U.S. Application Data

[63] Continuation-in-part of Ser. No. 152,817, Feb. 5, 1988, Pat. No. 4,846,457, which is a continuation-in-part of Ser. No. 767,718, Apr. 23, 1986, Pat. No. 4,727,697, which is a continuation of Ser. No. 364,811, Apr. 2, 1982, abandoned.

[51] Int. Cl.$^5$ .............................................. A63B 71/02
[52] U.S. Cl. ...................................... 272/3; 272/109; 404/32
[58] Field of Search ....................... 52/177; 5/443, 444, 5/448, 449, 465, 480, 481, 417–420; 272/3–5, 109; 273/195 A, 195 R; 404/31–37, 43

[56] References Cited

U.S. PATENT DOCUMENTS

| | | | |
|---|---|---|---|
| 957,387 | 5/1910 | Stedman | 404/32 |
| 2,999,431 | 9/1961 | Mitchell | 404/32 |
| 3,251,076 | 5/1966 | Burke | 272/109 |
| 3,846,945 | 11/1974 | Roby | 52/177 |
| 4,557,475 | 12/1985 | Donovan | 272/3 |
| 4,572,700 | 2/1986 | Mantarro et al. | 404/35 |

FOREIGN PATENT DOCUMENTS

| | | | |
|---|---|---|---|
| 58825 | 9/1982 | European Pat. Off. | 272/3 |
| 92837 | 11/1983 | European Pat. Off. | 272/3 |

Primary Examiner—Richard E. Chilcot, Jr.
Attorney, Agent, or Firm—Joseph Scafetta, Jr.

[57] ABSTRACT

Shock-attenuating seamless surface systems for use under and around playground equipment can be either installed on a base or installed in a recess in the base such that an integrated installation is obtained.

All systems have a surface layer with a bottom and outer edges; ribs extending from the bottom of the surface layer for defining an array of air-filled cells affixed to the bottom of the surface layer; and a first layer of sealer and an aggregate spread over the surface layer, the outer edges, and the base immediate to the surface system.

More complex systems may include one or more of the following: a plurality of median ribs extending a shorter distance from the bottom of the surface layer than the defining ribs in order to enhance and make consistent attenuating characteristics upon impact to the surface layer, to allow internal venting, and to facilitate conformity to the base; a void area left in place of at least one median rib in order to facilitate cutting through the surface layer; a second layer of sealer spread under the array of air-filled cells and above the base in order to prevent the escape of air therefrom upon impact thereto and hold the cells in a substantially vertical orientation with respect to the base; a sloping outer edge surrounding all sides to help prevent tripping and to facilitate access by handicapped persons; and a beveled outer edge surrounding all sides for facilitating attachment to either an identical surface or the base.

38 Claims, 5 Drawing Sheets

SHOCK-ATTENUATING SEAMLESS SURFACE SYSTEM FOR USE UNDER AND AROUND PLAYGROUND EQUIPMENT

CROSS REFERENCE TO RELATED APPLICATIONS

This application is a continuation-in-part of application Ser. No. 07/152,817, filed Feb. 5, 1988, now issued as U.S. Pat. No. 4,846,457 on July 11, 1989, which is a continuation-in-part (CIP) of U.S. patent application Ser. No. 06/767,718, filed Apr. 23, 1986, now issued as U.S. Pat. No. 4,727,697 on Mar. 1, 1988, which is a continuation of U.S. patent application Ser. No. 06/364,811, filed Apr. 2, 1982, now abandoned.

BACKGROUND OF THE INVENTION

1. Field of the Invention

The present invention relates generally to static structures, particularly traffic-carrying surfaces, and also relates to exercising devices, particularly gymnastic equipment, such as a children's play mat.

2. Description of the Related Art

School playgrounds, day care centers, playlands adjacent to fast food restaurants, and the like maintain exercising equipment for children's recreational activities. The activities in these designated play zones include climbing, jumping and swinging, and oftentimes result in falls to the ground. In fact, 70% of playground injuries are the result of impacts to the underlying surface.

In the past, natural grass was grown as a surface for use underneath playground equipment. Unfortunately, natural grass requires constant maintenance and varies in its shock attenuating ability. Furthermore, erosion, puddling and sanitation are major negative factors militating against the use of natural grass.

In the search for an answer to the problems posed by natural grass, two generic categories of surfacing used under all types of play equipment were defined: loose-fill and nonloose-fill. Loose fill surface systems consist of nonbonded particles, usually of a common type (e.g. sand, wood chips, etc.). Nonloose-fill surface systems consist of processed particles bonded together in some fashion (e.g. foam blocks, rubber-aggregate blocks together, etc.).

Loose-fill materials are generally placed under playground equipment to a depth averaging twelve inches and are usually contained by a wooden or concrete border. Although loose-fill materials provide excellent attenuating characteristics, it is difficult to maintain them at the proper depth and to keep them free of contamination. Changes in depth and infiltration by debris and water adversely affect the attenuating properties of such loose-fill materials. Furthermore, loose-fill surface systems tend to absorb dirt, debris, and toxins from the air, and water. Since small children oftentimes ingest loose-fill materials during play, constant replacement of such loose-fill materials is necessitated. Water, when absorbed into the loose-fill material, causes accelerated deterioration during normal use and freezing below 32° Fahrenheit.

With a desire for a more permanent and consistent, nonloose surface, nonloose-fill surface systems were developed to be installed over hard surfaces, such as concrete and asphalt. Nonloose-fill surfaces, which are generally referred to as synthetics, can be divided into two main categories: systems with seams and systems without seams. Examples of systems with seams or so-called nonseamless systems are shown in U.S. Pat. No. 4,557,457 to Donovan, U.S. Pat. No. 3,846,945 to Roby, U.S. Pat. No. 3,251,076 to Burke, U.S. Pat. No. 2,999,431 to Mitchell, and U.S. Pat. No. 957,387 to Stedman.

Both nonseamless and seamless surfacing systems have an attenuating element and a surface layer. This surface layer can be either installed in the field or integrated at the time of manufacture. However, the seamless systems have a texture coat of sealer and aggregate applied over the surface layer to form a monolithic arrangement.

Seamless surfacing systems are becoming the more desirable of the synthetic systems because insects and rodents cannot enter and nest in them, nor can dirt and debris collect in the seams. An additional benefit of seamless surfacing systems is that water is not allowed to enter into the system. Water, when introduced into the system, can cause structural deterioration, can cause delamination of the surface system from its subbase, and can cause the seamless surface system to freeze much more quickly and intensely in play conditions below 0.0 degrees Celsius.

Finally, the recognized methodology for testing the shock attenuating properties of playground and athletic surfacing systems is the American Society for Testing and Materials (hereinafter ASTM) F-355 test which uses three different missiles at impact velocities appropriate for the intended end-use: Procedure A uses a cylindrical missile, weighing twenty pounds and having a circular, flat, metallic, impacting face of twenty square inches; Procedure B, uses a metallic hemisphere weighing fifteen pounds and having an impacting surface with a radius of 3.25 inches; and third, Procedure C, uses a metallic headform weighing eleven pounds (five kilograms).

The report section within the ASTM F-355 test methodology lists various ways to collect and analyze data. The two most important measurements of the shock attenuating characteristics of a surfacing system are: (A) the G-max which is the maximum acceleration experienced over the duration impact, and (B) the Severity Index which is an integration of the G-max over the duration of the impact. The G-max represents the maximum stress point experienced by the impacting body over the duration of the impact; the Severity Index represents the total stress experienced by the impacting body over the duration of the impact. A G-max of 200 and a Severity Index of 1,000 are internationally recognized as the threshold for skull concussion with respect to human beings.

In Apr., 1981, The Consumer Products Safety Commission (hereinafter CPSC) published Guidelines For Public Playground Equipment, Volumes I and II. In Volume II, page 22, Sections 12.1–12.5, the CPSC recommends use of a surface system under public playground equipment that will not exceed a 200 G-max when tested as per the ASTM F-355 test; Procedure at the maximum estimated fall height of a piece of playground equipment. Since their publication, the CPSC's surface system guidelines have been used by a significant number of both public and private playground operators that are concerned about playground safety.

The ASTM is presently finishing a Standard Specification for surface systems used under playground equipment and is based on the CPSC's Guidelines for surface systems. The ASTM's Standard Specification for surface systems, when published, will clearly define a laboratory test procedure and a field test procedure within a specified temperature range for all loose-fill and nonloose-fill surface systems.

The ASTM's Standard Specification will provide the consumer with a convenient tool with which he or she can measure and specify the performance and quality of all types of playground surface systems.

Future editions of the ASTM's Standard Specification for surface systems used under playground equipment will undoubtedly require, in addition to a maximum G-max value of 200, a maximum Severity Index value of 1000. The Severity Index relates principally to human head injuries which are the most damaging and difficult to treat.

As the level of consumer awareness rises and technological advances in manufacturing continue to increase, performance guidelines will transform into future product standard specifications. The British Government currently mandates a G-max value of less than 200 and a Severity Index value of less than 1000, utilizing the ASTM F-355 test, Procedure B, for surface systems used under playground equipment in the United Kingdom.

SUMMARY OF THE INVENTION

The invention is a protective, seamless surface system to be installed over a hard surface where falls to the ground are likely. Since the surface system is seamless, neither dirt nor debris can collect or lodge in seams, nor can insects enter to nest therein. The protective system does not permit significant absorption of dirt, debris, or toxins from polluted air. Water is neither absorbed, allowed entry, nor retained in any significant quantity anywhere in the protective system. In zones where falls are likely, such as under and around exercising equipment on school playgrounds, day care centers, and playlands adjacent to fast food restaurants, the invention can be used to minimize the incidence and severity of injuries that are likely to occur in such play environments. Finally, the present invention is engineered in such a fashion that it will meet or exceed current CPSC guidelines and the forthcoming ASTM Standard Specification for surface systems used under playground equipment.

It is an object of the present invention to provide a seamless surface system that can be either installed over a hard base, such as asphalt or concrete, or installed over a semi-hard surface indoors (e.g. plywood, maple, etc.).

It is an object of the present invention to provide a surface system engineered and constructed in a seamless fashion such that neither dirt and debris are allowed to enter or lodge in the system, nor insects are allowed entry to nest therein.

It is an object of the present invention to provide a seamless surface system engineered and constructed in a fashion such that significant absorption of dirt, debris, and toxins from polluted air is not permitted, and such that the inhaling of toxic dust produced by mixing dirt, debris and toxins, is negligible for the children playing on the surface system.

It is an object of the present invention to provide a surface system engineered and constructed in a seamless fashion such that moisture is not permitted in sufficient quantity to enter and be retained therein, in order to prevent or minimize the possibility of: delamination of the surface system from its base; accelerated structural deterioration of the surface system; and accelerated freezing in play conditions below 0.0 degrees Celsius.

Furthermore, it is an extremely important object of the present invention to provide a protective seamless surface system that meets or exceeds the current CPSC guidelines and the forthcoming ASTM Standard Specification for surface systems installed under playground equipment.

How these objects and other advantages of the present invention are obtained will become more readily understood from the following brief description of the drawings and the subsequent detailed description of the preferred embodiments.

Figure 1A:
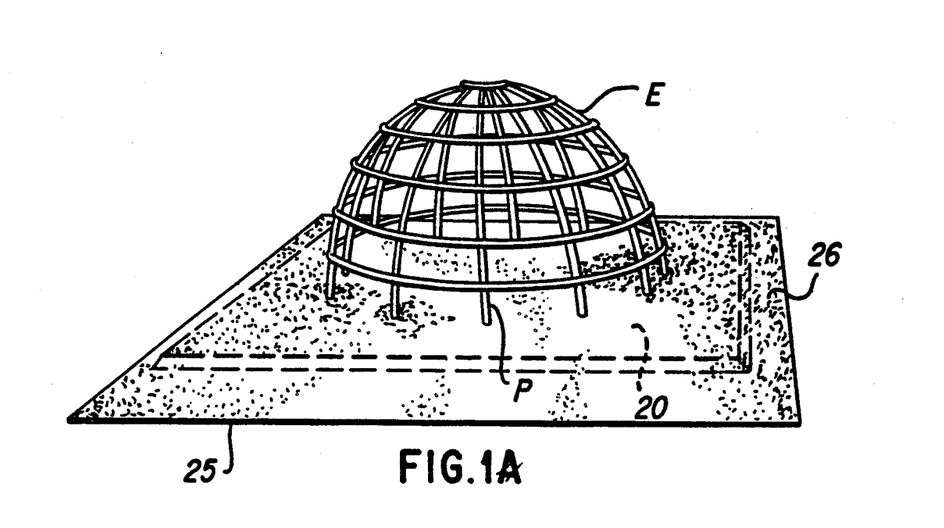
FIG. 1A is a perspective view of the present which is a seamless surface system to be used under and around playground equipment.
Figure 1B:
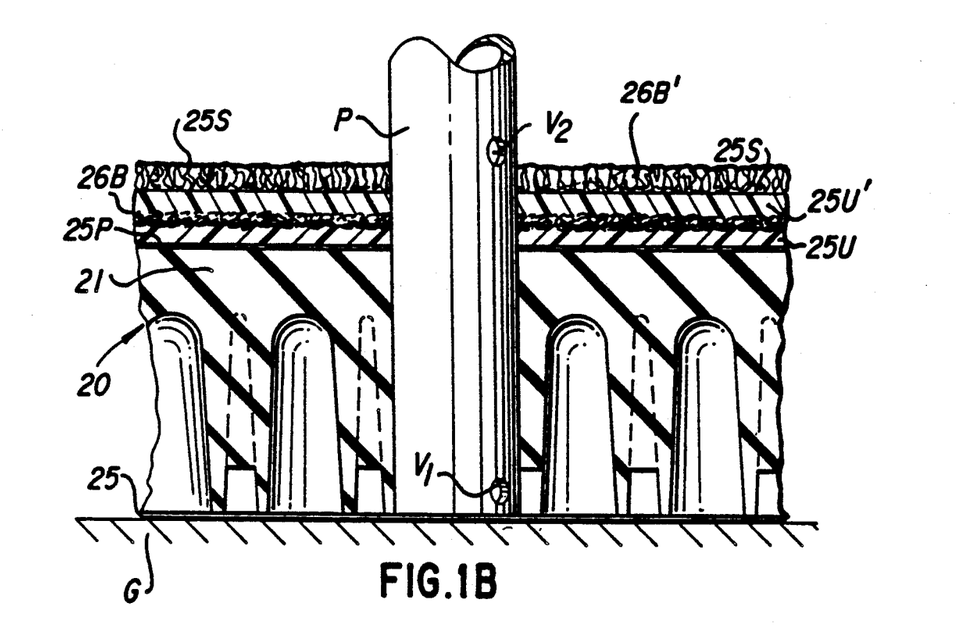
FIG. 1B is a cross-sectional view of a mat of the present invention used with playground equipment.
Figure 5A:
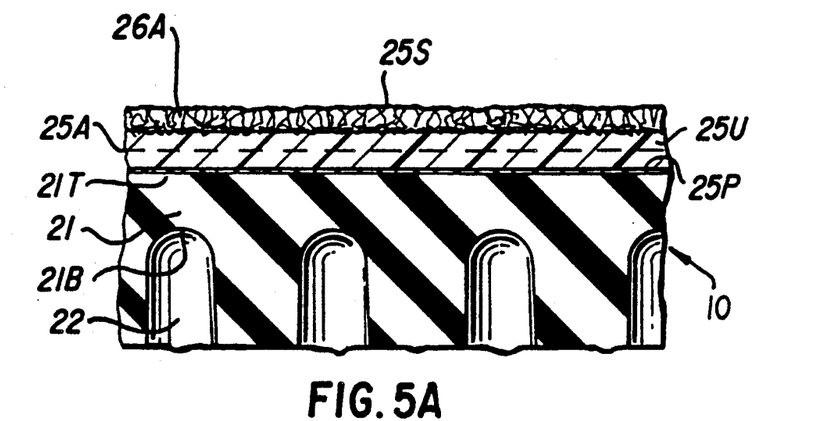
FIG. 5A is a partial cross-sectional view of a first embodiment of a top sealer and aggregate used in the present invention.
Figure 5B:
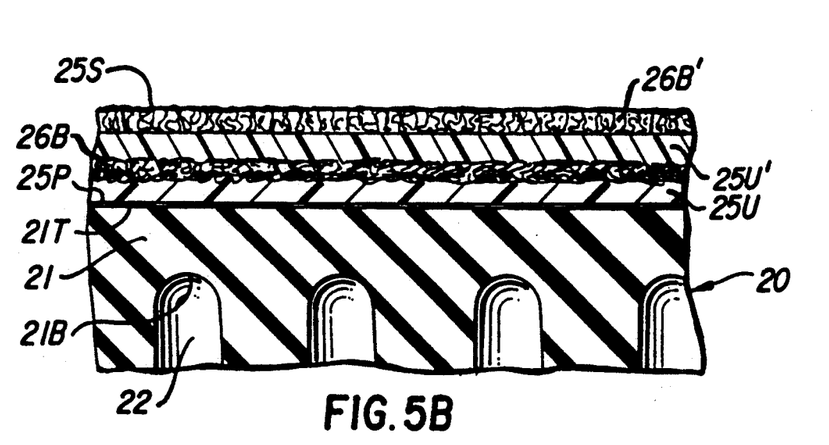
FIG. 5B is a partial cross-sectional view of a second embodiment of a top sealer and aggregate used in the present invention.
Figure 5C:
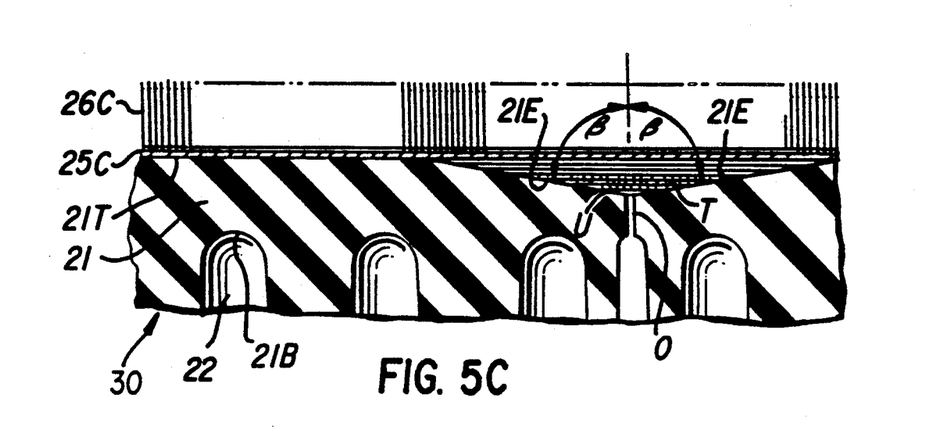
FIG. 5C is a partial cross-sectional view of a third embodiment of a top sealer and synthetic turf.

DETAILED DESCRIPTION OF THE PREFERRED EMBODIMENTS:

In FIGS. 1A and 1B of the drawings, the second embodiment shown in FIG. 5B is illustrated in either a playground or a children's play area. In particular, with reference to FIG. 1A, a mat 20 is shown in phantom lines underlying a top aggregate 26 and a bottom sealer 25. A conventional piece of exercising equipment E with climbing poles P for children is installed thereover. Referring to FIG. 1B, it is shown therein that each pole P of the climbing equipment E of FIG. 1A has at least one hole drilled as a vent $V_1$ above the bottom sealer 25 adjacent to the ground G but below a surface layer 21. The pole P also has at least one hole drilled as a vent $V_2$ above a top aggregate 26B' and a urethane sealer 25S. These vents $V_1$ and $V_2$ allow the mat 20 to be ventilated both internally and externally in order to remove any moisture and other gas vapors that may be carried up through the bottom sealer 25 from the ground G. Thus, this passage made between vents $V_1$ and $V_2$ through the pole P relieves any gas pressure resulting, for example, either from heat generated by steam percolated on hot days or from moisture migrated up on cool days either through the ground G or otherwise somehow introduced between the bottom sealer 25 and the top urethane sealer 25S.

Figure 2:
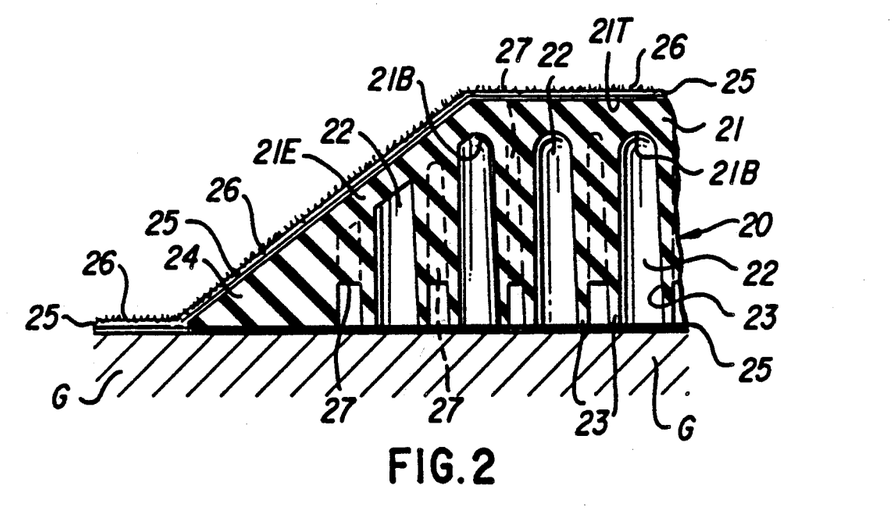
FIG. 2 is a cross-sectional view of a mat of the present invention installed on the ground.

In FIG. 2, a first embodiment of the impact-absorbing safety mat 20 is placed on the ground G which may be either an asphalt or a concrete base. The mat 20 has a surface layer 21 with a bottom 21B and an outer edge 21E. A honeycombed array of air-filled cells 22 depend from the bottom 21B of the surface layer 21. Ribs 23 extend from the bottom 21B of the surface layer 21 and define the honeycombed array of air-filled cells 22. A sloping outer edge 24 surrounds all sides of the mat 20, this sloping outer edge 24 helps to prevent tripping and facilitates access by the handicapped. The sealer 25 and the aggregate 26 are spread over a top 21T of the surface layer 21, the sloping outer edge 24, and the ground G immediately adjacent to the mat 20, so that the sealer 25 prevents the sloping outer edge 24 from lifting up and warping, thus maintaining the integrity of the installed system. A second layer of the sealer 25 is also spread under the array of air-filled cells 22 so that both air and moisture are prevented from entering into and escaping from the air-filled cells 22. This second bottom layer of the sealer 25 also helps to hold the array of air-filled cells 22 in a substantially vertical orientation with respect to the ground G. Median ribs 27 extend a shorter distance from the bottom 21B of the surface layer 21 than the defining ribs 23 and give added support to the surface layer 21 against a strong blow striking the array of air-filled cells 22.

Figure 3:
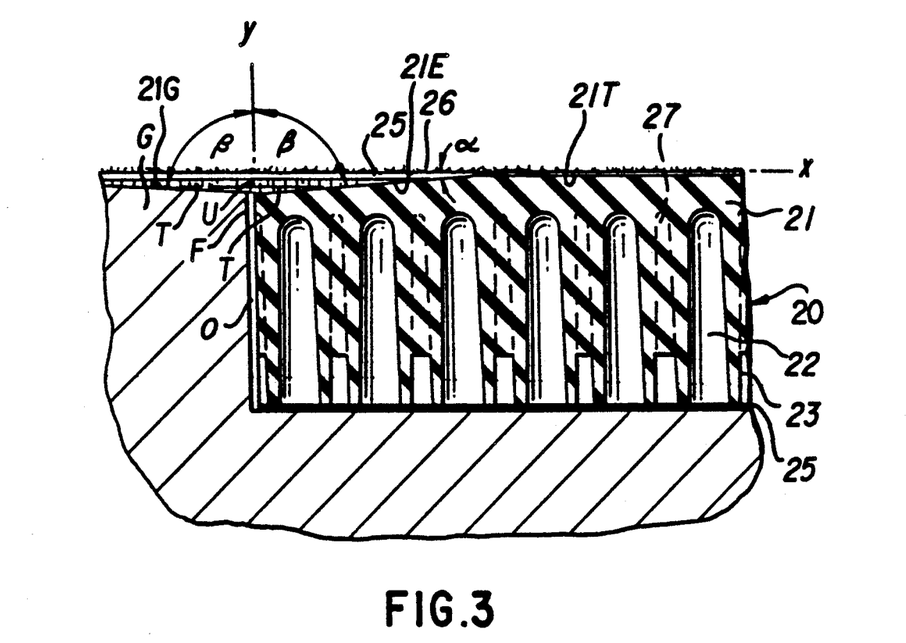
FIG. 3 is a cross-sectional view of a mat of the present invention recessed in the ground.

In FIG. 3, a second embodiment of an impact-absorbing safety mat 20 is recessed in the ground G which again may be either a concrete or an asphalt base. The structure of the second embodiment is identical to the structure of the first embodiment shown in FIG. 2 except that the second embodiment omits the sloping outer edge 24. Also, the surface layer 21 has a modified outer edge 21E which is a bevel or chamfer. A bevel is defined by Webster's New Collegiate Dictionary (1981) at page 105 as "the angle that one surface or line makes with another when they are not at right angles". In this second embodiment, the preferred gradation of an angle $\beta$ (beta) formed between the vertical y-axis extending along a face of the recess in the ground G and the beveled outer edge 21E is 83.75°. This angle $\beta$ is made by extending the outer edge 21E back two inches along the horizontal x-axis and dropping the outer edge 21E down one-eight inch along the y-axis so that the angle $\beta$ has a 16:1 ratio or a complementary angle $\alpha$ (alpha) of 6.25°. An opening O left between the beveled outer edge 21E and the beveled outer edge 21G of the ground G, is immediately adjacent the face F of the recess in the ground G. This opening O is covered over with a fiberglass mesh tape T which is, in turn, penetrated by a urethane paste U comprised of urethane and fine mesh rubber granules that enter holes in the tape T, thus encapsulating the tape T. The urethane paste U is built up until it fills the bevel or chamfer forming the angles $\alpha$ between the x-axis and the adjacent beveled outer edges 21E and 21G, so that the tape T and the urethane paste U secure the mat 20 to the ground G. The top of the urethane paste U, which encapsulates the tape T, and the top 21T of the surface layer 21 are now flush with the ground G. Subsequently, the top 21T of the surface layer 21, the top of the urethane paste U, which encapsulates tape T, and the ground G, which is immediately adjacent the urethane paste U, are covered over by the sealer 25 and the aggregate 26. Thus, the mat 20 becomes seamless with the ground G to form an integrated installation therewith.

Additionally, by using slightly modified seaming techniques as those techniques of spacing, taping, and pasting described with reference to FIG. 3, the mat 20 can become seamless and form an integrated installation with any structure, such as the support pole P shown in FIGS. 1A and 1B, that protrudes from the base.

Figure 4A:
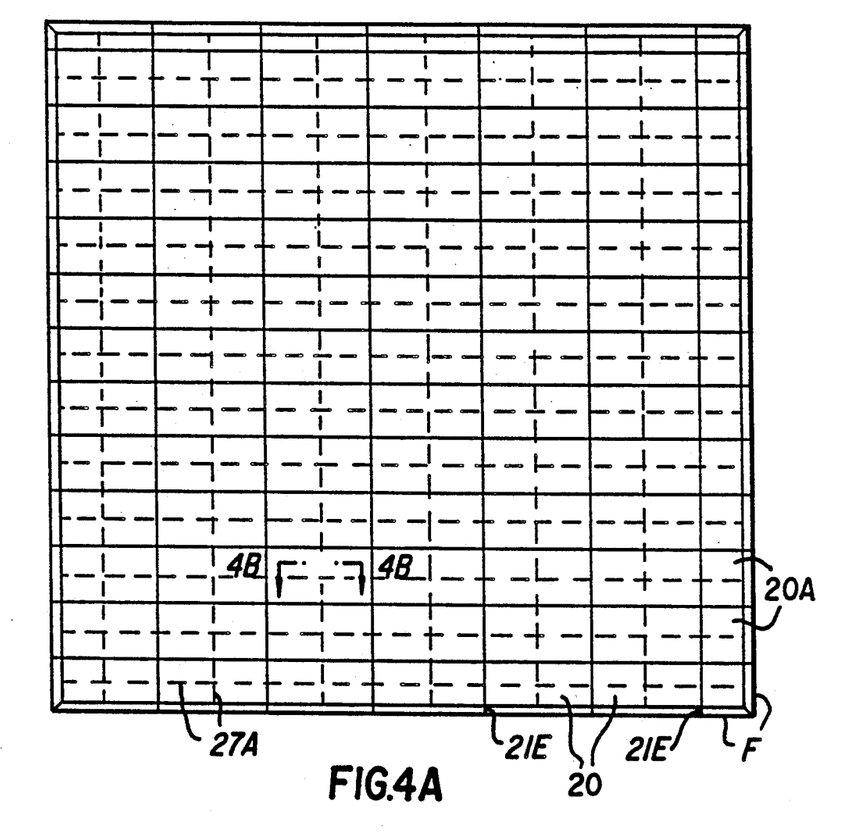
FIG. 4A is a top plan view of a plurality of contiguous mats of the present invention.

In FIG. 4A, a plurality of mats 20 is shown to be laid in a predetermined pattern. In this top view of FIG. 4A, the mats 20 are adjacent to each other. However, one layer of mats 20 may be placed on top of another layer in order to double the impact-absorbing ability of the integrated installation. The mats 20 shown in FIG. 4A may have the sealer 25 and the aggregate 26 spread thereover. FIG. 4A also shows the beveled outer edges 21E in solid lines, along which each mat 20 is joined, in a manner to be described with regard to FIG. 6B, to an adjacent identical mat 20. For the sake of simplicity, the bevel or chamfer on all four outer edges 21E is not shown in FIG. 4A, but is illustrated in a cross-sectional view only along the face F of the recess seen in FIG. 3. In FIG. 4A, each mat 20 is preferably four feet long and two feet wide, as can be seen by viewing the solid lines which are drawn in a pattern showing the length of each mat 20 to be twice the width. Each dashed line shown in FIG. 4A represents a void area 27A where a median rib 27 is omitted during the manufacture of each mat 20.

Figure 4B:
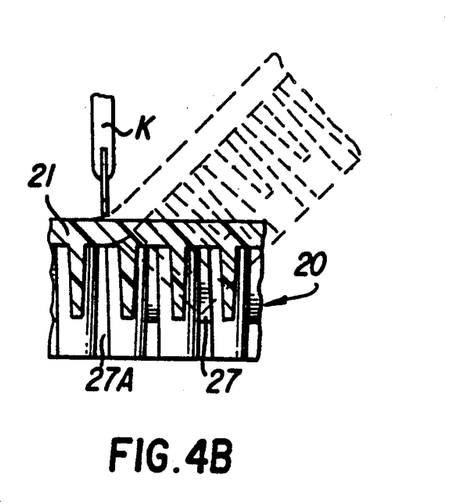
FIG. 4B is a cross-sectional view of the present invention taken along line 4B—4B in FIG. 4A.

In FIG. 4B, the purpose of the void area 27A is shown to allow an installer to sever a selected mat 20 in half through the surface layer 21 with a cutting knife K so that each 2' by 4' mat may become either a 2' by 2' mat or a 1' by 4' mat, depending upon whether the cut is made through the middle thereof either widthwise or lengthwise, respectively. The provision of void areas 27A in the mat 20 is exemplified by returning briefly to FIG. 4A, wherein along the right hand side thereof, it may be seen from the solid lines that a plurality of mats 20A have been cut as 2' by 2' mats by cutting 2' by 4' mats 20 widthwise. Also, as indicated previously surface configurations having odd footage measurements may be covered by severing the 2' by 4' mat 20 lengthwise into two 1' by 4' sections.

Figure 4C:
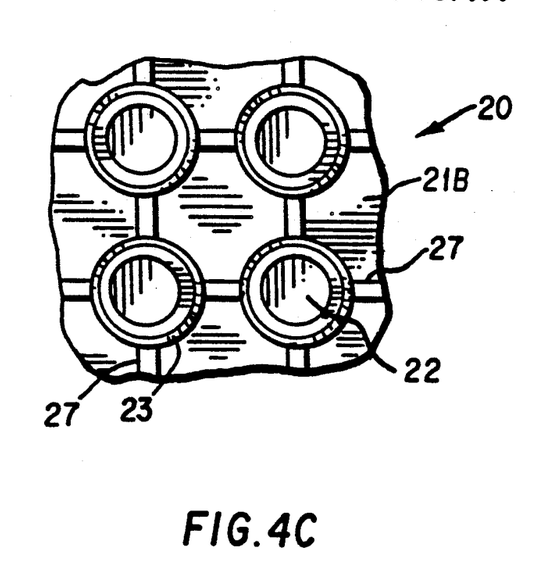
FIG. 4C is a bottom plan view of a mat of the present invention.

In FIG. 4C, the underside of the surface layer 21 is shown with the bottoms of four selected adjacent air-filled cells 22. The cylindrical ribs 23 defining the array of air-filled cells 22 extend from the bottom 21B of the surface layer 21 and have slight tapers. Each cell 22 has one median rib 27 at the so-called 3, 6, 9 and 12 o'clock positions around its defining rib 23 so that each cell 22 is connected in a honeycomb to each other cell 22 positioned to its east, south, west, and north, respectively.

The median ribs 27 allow the mat 20 to conform easily to the contour of the base during installation. Also, the median ribs 27 allow internal venting from locations where moisture has somehow been introduced into the surface system.

A single layer of mat 20 has been subjected to the ASTM F-355 test and has been determined to satisfy the guidelines of the CPSC for a six-foot drop of all three impact missiles, i.e. the 20-lb. cylindrical missile, the 15-lb. metallic hemisphere, and the 11-lb. metallic headform, mentioned above in the Description of the Related Art. Furthermore, two layers, one laid upon the other, of mat 20 satisfy the CPSC guidelines for a twelve-foot drop of all three impact missiles listed above. These guidelines are set forth in the Handbook for Public Playground Safety, Volume 2, page 22, Sections 12.1–12.5. The mat 20 satisfying these guidelines helps to prevent a child from suffering a skull concussion in a fall from standard playground equipment. Also, since the composite tensile strength of each mat 20 exceeds 300 pounds per square inch (psi), children cannot vandalize the mat 20 in place without the aid of tools.

Figure 6A:
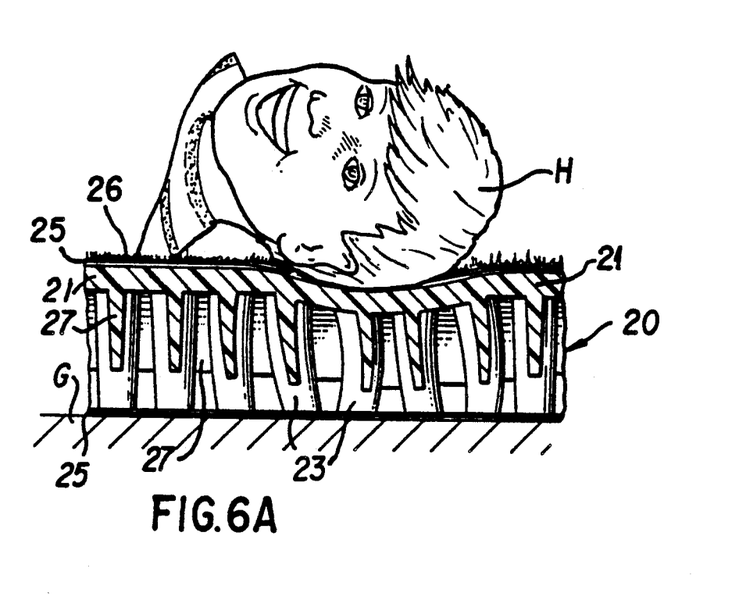
FIG. 6A is a partial cross-sectional view taken along line 4A—4A in FIG. 1A, shown with a child's head impacting the surface system.
Figure 6B:
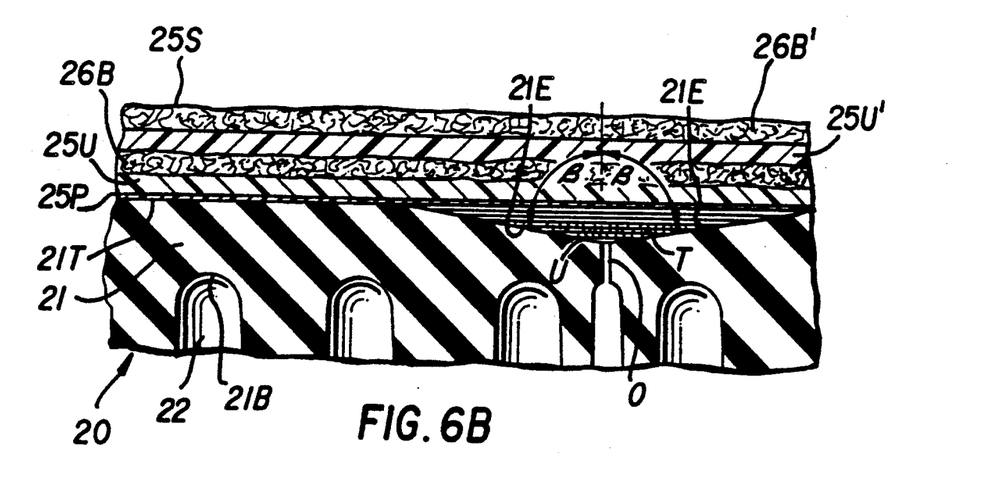
FIG. 6B is a partial cross-sectional view of a fourth embodiment of a top sealer and aggregate used in the present invention.

In FIGS. 5B and 6B, two embodiments of the sealer 25 and aggregate 26 of the present invention are shown. Each embodiment in FIGS. 5B and 6B is shown on the top 21T of the surface layer 21 with a plurality of air-filled cells 22 depending from the bottom 21B thereof.

In FIG. 5B illustrating the present invention, the mat 20 is preferred for use under exercising equipment and other play areas for children. A so-called "leveler" coat is applied to the mat 20 in several steps. First, a bottom primer 25P is applied over the top 21T of the surface layer 21. Then, a urethane 25U is applied over the bottom primer 25P. Rubber granules comprising an aggregate 26B are next broadcast into the "wet" urethane 25U to the point of refusal. When the urethane 25U has dried, the excess rubber granules comprising the aggregate 26B are removed. The above steps are repeated with a second urethane 25U' applied over the rubber granules comprising the aggregate 26B followed by a second plurality of rubber granules comprising another aggregate 26B' broadcast to the point of refusal into the urethane 25U'. When the second urethane 25U' has dried, the excess rubber granules comprising the aggregate 26B' are removed and a urethane sealer 25S is applied over the rubber granules making up the second aggregate 26B'. Thus, in this embodiment of the present invention the sealer, the sealer 25 includes a two-component urethane (25U, 25U') and a one-component urethane sealer 25S while the aggregate 26 includes two layers of rubber granules (26B, 26B'). The "leveler" coat (25U and 26B) may be omitted either if the ground G is not irregular enough to warrant its use, or if additional dissipation of the kinetic energy of an impacting body is not deemed necessary.

Summarizing FIGS. 5B and 6B, the sealer 25 and the aggregate 26 cover the mat 20. A key function of the combined sealer 25 and aggregate 26 is to prevent any significant or rapid loss of attenuating properties due to weathering and/or exposure to ultraviolet radiation from the sun.

In FIG. 6A illustrating a third embodiment of the shock-attenuating mat 20, a child's head H is shown contacting the aggregate 26 and the sealer 25 on top of the surface layer 21 of the mat 20. Because the sealer 25 that covers the surface layer 21 on top of the mat 20 also seals off the bottom, of each air-filled cell 22 defined by ribs 23 the air compresses within each air-filled cell 22 defined by the ribs 23 thus allowing for excellent shock attenuation on impact of the child's head H. Also, it can be seen that the sealer 25 and the median ribs 27 hold the air-filled cells 22 defined by the ribs 23 in a honeycombed array in a substantively vertical position with respect to the ground G, further enhancing shock attenuating characteristics.

In FIG. 6B illustrating a fourth embodiment of the sealer 25 and the aggregate 26, the manner in which each mat 20 is joined to an adjacent identical mat 20, as mentioned in the discussion of FIG. 4A, is shown. First, each mat 20 is spaced by an opening O from the adjacent identical mat 20. This opening O allows for thermal expansion and contraction of each mat 20 laid down in a predetermined pattern. The opening O between beveled outer edges 21E of adjacent mats 20 is seamed with the same fiberglass mesh tape T and urethane paste U used at the face F of the recess shown in FIG. 3. This tape T with the urethane paste U is built up until it fills the bevel or chamfer forming the angles a between the adjacent beveled outer edges 21E. Then primer 25P, a first layer of urethane 25U, a first layer of granules 26B, a second layer of urethane 25U, a second layer of granules 26B, and a sealer 25S are applied over the surfaces 21T of adjacent mats 20 and the urethane paste U, in a manner previously described with regard to FIG. 5B, so that a monolithic arrangement is formed.

Referring to the present invention in the embodiments of the mat 20 shown in FIGS. 1A, 1B, 2, 3, 5B, 6A, and 6B for use as a seamless shock attenuating surface system used under and around playground equipment, it functions as denoted as follows:

first to provide a seamless surface system that can be installed either over a hard outdoor base, such as asphalt and concrete, or over a wooden indoor base, such as plywood and maple;

second to prevent the entering and nesting of insects and rodents into the system;

third to provide a seamless surface system such that no significant amount of either dirt, debris, water, or contaminated air can be absorbed into and combined within the surface system to produce a toxic dust that may be inhaled by children playing on the surface system;

fourth to prevent the entry and retention of moisture in sufficient quantity in order to either eliminate or minimize the possibility of delamination, structural deterioration, and accelerated freezing in play conditions below 0.0 degrees Celsius;

fifth to provide a seamless surface system that is accessible and stable enough to be used by handicapped persons;

sixth to provide a surface that is easily maintained and that is virtually impossible to be damaged by children without the aid of tools, seventh to provide a seamless surface system engineered and constructed such that it is possible to guarantee the installed product with a five year warranty, including a clause stating that, after reconditioning of the surface system, the sysem can be guaranteed for an additional five-year period by a second warranty identical in terms to the initial five-year warranty, eighth to meet or exceed the current CPSC guidelines for playground surfacing and the forthcoming ASTM Standard Specification for surface systems installed under playground equipment.

The foregoing preferred embodiments are considered illustrative only. Numerous other modifications will readily occur to those persons skilled in this particular technology after reading the specification above. Consequently, the disclosed invention is not limited by the exact construction and operation shown and described above but rather is defined by the claims appended hereto.

I claim:

1. A surface system, for use under and around playground equipment, for placement on a base, comprising:
   a surface layer having a bottom and outer edges;
   rib means, extending from the bottom of the surface layer, for defining an array of air-filled cells affixed to the bottom of the surface layer;

a sealer and aggregate spread over the surface layer, the outer edges, and the base immediate to the surface system;

median rib means, extending a shorter distance from the bottom of the surface layer than the defining rib means, for defining a structure that produces consistent attenuating characteristics upon impact to the surface layer, for facilitating internal venting of the surface system, and for facilitating conformity of the surface system to the base; and a sloping outer edge means, surrounding all sides of the surface system, for helping to prevent tripping and for facilitating access by handicapped persons.

2. The surface system, according to claim 1, wherein: said array of air-filled cells is a honeycomb.

3. The surface system, according to claim 1, wherein: said surface system is capable of being joined to an identical surface system.

4. A surface system, for use under and around playground equpment, for placement on a base, comprising:
a surface layer having a bottom and outer edges;
rib means, extending from the bottom of the surface layer, for defining an array of air-filled cells affixed to the bottom of the surface layer;
sealer and aggregate spread over the surface layer, the outer edges, and the base immediate to the surface system;
a plurality of median rib means, extending a shorter distance from the bottom of the surface layer than the defining rib means, for defining a structure that produces consistent shock attenuating characteristics upon impact to the surface layer, for facilitating internal venting of the surface system, and for facilitating conformity of the surface system to the contour of the base and
at least one void area means, arranged in place of at least one of the plurality of median rib means, for facilitating cutting of the surface system through the surface layer.

5. The surface system, according to claim 4, wherein: said void area means includes one void area provided through a middle of the array of air-filled cells lengthwise and a second void area provided through a middle of the array of air-filled cells widthwise.

6. The surface system, according to claim 4, wherein: said array of air-filled cells is a honeycomb.

7. The surface system, according to claim 4, wherein: said surface system is capable of being joined to an identical surface system.

8. A surface system, for use under and around playground equpment, for placement on a base, comprising:
a surface layer having a bottom and outer edges;
rib means, extending from the bottom of the surface layer, for defining an array of air-filled cells affixed to the bottom ot the surface layer;
sealer and aggregate spread over the surface layer, the outer edges, and the base immediate to the surface system; and
median ribs extending a shorter distance from the bottom of the surface layer than the defining rib means.

9. The surface system, according to claim 8, wherein: said array of air-filled cells is a honeycomb.

10. The surface system, according to claim 8, wherein: said surface system is capable of being joined to an identical surface system.

11. A surface system, for use under and around playground equipment, for placement in a recess in a base, comprising:
a surface layer having a bottom and outer edges;
rib means, extending from the bottom of the surface layer, for defining an array of air-filled cells affixed to the bottom of the surface layer;
a first layer of sealer means and aggregate means, spread over the surface layer, the outer edges, and the base immediate to the surface system, for preventing loss of attenuating properties in the surface system due to weathering and exposure to ultraviolet solar radiation;
a second layer of sealer means, spread under the array of air-filled cells and above the base, for preventing the escape of air therefrom upon impact thereto and also for holding the array of air-filled cells in a substantially vertical orientation with respect to the base; and
a beveled outer edge means, surrounding all sides of the surface system, for facilitating attachment of the surface system to any structure protruding from the base on at least one side of the surface system;
whereby the surface system placed adjacent to the structure protruding from the base forms an integrated installation with the structure protruding from the base.

12. The surface system, according to claim 11, wherein:
said array of air-filled cells is a honeycomb.

13. The surface system, according to claim 11, wherein:
said surface system is capable of being joined to an identical surface system.

14. The surface system, according to claim 11, further comprising:
tape means, secured to the beveled outer edge means and the structure protruding from the base, for attaching the structure protruding from the base flush with the surface system on at least one side of the surface system.

15. The surface system, according to claim 14, further comprising:
paste means, applied to the tape means, for facilitating attachment of the structure protruding from the base flush with the surface system on at least one side of the surface system.

16. A surface system, for use under and around playground equipment, for placement on a base, comprising:
a surface layer having a bottom and outer edges;
rib means, extending from the bottom of the surface layer, for defining an array of air-filled cells affixed to the bottom of the surface layer;
sealer and aggregate spread over the surface layer, the outer edges, and the base immediate to the surface system;
a plurality of median ribs extending a shorter distance from the bottom of the surface layer than the defining rib means; and
at least one void area means, arranged in place of at least one of the plurality of median ribs, for facilitating cutting of the surface system through the surface layer.

17. The surface system, according to claim 16, wherein:
said void area means includes one void area provided through a middle of the array of air-filled cells lengthwise and a second void area provided through a middle of the array of air-filled cells widthwise.

18. The surface system, according to claim 16, wherein:
said array of air-filled cells is a honeycomb.

19. The surface system, according to claim 16, wherein:
said surface system is capable of being joined to an identical surface system.

20. A surface system, for use under and around playground equipment, for placement on a base, comprising:
a surface layer having a bottom and outer edges;
rib means, extending from the bottom of the surface layer, for defining an array of air-filled cells affixed to the bottom of the surface layer;
sealer and aggregate spread over the surface layer, the outer edges, and the base immediate to the surface system; and
a sloping outer edge surrounding all sides of the surface system.

21. The surface system, according to claim 20, wherein:
said array of air-filled cells is a honeycomb.

22. The surface system, according to claim 20, wherein:
said surface system is capable of being joined to an identical surface system.

23. A surface system, for use under and around playground equipment, for placement on a base, comprising:
a surface layer having a bottom and outer edges;
rib means, extending from the bottom of the surface layer, for defining an array of air-filled cells affixed to the bottom of the surface layer;
a first layer of sealer and an aggregate spread over the surface layer, the outer edges, and the base immediate to the surface system; and
a second layer of sealer spread under the array of air-filled cells and above the base.

24. The surface system, according to claim 23, wherein:
said array of air-filled cells is a honeycomb.

25. The surface system, according to claim 23, wherein:
said surface system is capable of being joined to an identical surface system.

26. A surface system, for use under and around playground equipment, for placement on a base, comprising:
a surface layer having a bottom and outer edges;
rib means, extending from the bottom of the surface layer, for defining an array of air-filled cells affixed to the bottom of the surface layer;
sealer and aggregate means, spread over the surface layer, the outer edges, and the base immediate to the surface system, for preventing loss of attenuating properties in the surface system due to weathering and exposure to ultraviolet solar radiation;
median rib means, extending a shorter distance from the bottom of the surface layer than the defining rib means for giving added support against a strong blow striking the surface layer and the array of air-filled cells affixed thereto; and
a beveled outer edge means, surrounding all sides of the surface system, for facilitating attachment of the surface system to a first identical surface system on at least one side of the surface system.

27. The surface system, according to claim 26, wherein:
said array of air-filled cells is a honeycomb.

28. The surface system, according to claim 26, wherein:
said surface system is capable of being joined to a second identical surface system on top of said surface system.

29. The surface system, accoring to claim 26, further comprising:
tape means, secured to the beveled outer edge means and the first identical surface system, for attaching the surface system flush with the first identical surface system on at least one side of the surface system.

30. The surface system, according to claim 29, further comprising:
paste means, applied to the tape means, for facilitating attachment of the surface system flush with the first identical surface system on at least one side of the surface system.

31. A surface system, for use under and around playground equipment, for placement on a base, comprising:
a surface layer having a bottom and outer edges;
rib means, extending from the bottom of the surface layer, for defining an array of air-filled cells affixed to the bottom of the surface layer; and
sealer and aggregate means, spread over the surface layer, the outer edges, and the base immediate to the surface system, for preventing loss of attenuating properties in the surface system due to weathering and exposure to ultraviolet solar radiation.

32. The surface system, according to claim 31, wherein:
said array of air-filled cells is a honeycomb.

33. The surface system, according to claim 31, wherein:
said surface system is capable of being joined to an identical surface system.

34. A surface system, for use under and around playground equipment, for placement in a recess in a base, comprising:
a surface layer having a bottom and outer edges;
rib means, extending from the bottom of the surface layer, for defining an array of air-filled cells affixed to the bottom of the surface layer;
sealer and aggregate spread over the surface layer, the outer edges, and the base immediate to the surface system; and
a beveled outer edge means, surrounding all sides of the surface system, for facilitating attachment of the surface system to the base on at least one side of the surface system;
whereby the surface system placed in the recess in the base forms an integrated installation with the recess in the base.

35. The surface system, according to claim 34, wherein:
said array of air-filled cells is a honeycomb.

36. The surface system, according to claim 34, wherein:
said surface system is capable of being joined to an identical surface system.

37. The surface system, according to claim 34, further comprising:
tape means, secured to the beveled outer edge means and the base, for attaching the surface system flush with the base on at least one side of the surface system.

38. The surface system, according to claim 37, further comprising:
paste means, applied to the tape means, for facilitating attachment of the surface system flush with the base on at least one side of the surface system.

* * * * *

UNITED STATES PATENT AND TRADEMARK OFFICE
CERTIFICATE OF CORRECTION

PATENT NO. : 4,991,834

DATED : February 12, 1991

INVENTOR(S) : Thomas M. Vaux

It is certified that error appears in the above-identified patent and that said Letters Patent is hereby corrected as shown below:

Col. 1,    line 41, "Loose fill" should be "Loose-fill";
                 line 45, change "to-" to --,--;
                 line 46, delete "gether";
                 line 57, delete ",";
                 line 63, delete "," and
                 line 64, "nonloose" (first occurrence) should be --nontoxic--

Col. 2,    line 3, "4,557,457" should be --4,557,475--;
                 line 31, delete ",".
                 line 33, delete ",";
                 line 36, delete ",";
                 line 60, change ";" to --,--; after "Procedure", insert "C,";
                 line 65, change "that" to --who--; and
                 line 68, change "and" to --. The ASTM's Standard     Col. 4,    line 17, after "present", insert --invention--; and
                 line 47, delete ":".

UNITED STATES PATENT AND TRADEMARK OFFICE
CERTIFICATE OF CORRECTION

PATENT NO. : 4,991,834

DATED : February 12, 1991

INVENTOR(S) : Thomas M. Vaux

It is certified that error appears in the above-identified patent and that said Letters Patent is hereby corrected as shown below:

Col. 5,    line 49, "eight" should be --eighth--.

Col. 6,    line 5, after "techniques" (first occurrence), insert --, such--;
                line 41, "have" should be --has--; and
                line 42, after "previously", insert --,--.

Col. 7,    line 35, delete "the sealer" (first occurrence);
                line 54, delete ",";
                line 55, after "23", insert --,--; and
                line 60, change "substantively" to --substantially--.

Col. 8,    line 7, "a" should be --$\underline{a}$--;
                line 10, change "25U" to --25U'--;
                line 11, change "26B" to --26B'--;
                line 19, delete --as denoted--;
                line 20, after "first", insert --,--;
                line 24, after "second", insert --,--;
                line 26, after "third", insert --,--;
                line 32, after "fourth", insert --,--;
                line 37, after "fifth", insert --,--;

UNITED STATES PATENT AND TRADEMARK OFFICE
CERTIFICATE OF CORRECTION

PATENT NO. : 4,991,834

DATED : February 12, 1991

INVENTOR(S) : Thomas M. Vaux

It is certified that error appears in the above-identified patent and that said Letters Patent is hereby corrected as shown below:

```
          line 40, after "sixth", insert --,--; after "a",
insert --seamless--; and after "surface", insert --system--;
          line 42, change "," to --;--;
          line 43, after "seventh", insert --,--;
          line 45, change "five year" to --five-year--;
          line 49, change "," to --; and--; and
          line 50, after "eighth", insert --,--.

Col. 9,   line 20, in claim 4, correct the spelling of
"equipment"; and
          line 35, in claim 4, after base, insert ";".

Col. 12,  line 6, in claim 29, correct the spelling of
"according".
   Col. 10, line 16, claim 11, after "thereto", insert --,--; and
   Col. 11, line 59, claim 26, after "means", insert --,--.
```

Signed and Sealed this

Fourteenth Day of January, 1992

Attest:

HARRY F. MANBECK, JR.

*Attesting Officer*     *Commissioner of Patents and Trademarks*